(12) United States Patent
Tinnin

(10) Patent No.: US 8,863,609 B2
(45) Date of Patent: Oct. 21, 2014

(54) ON-CENTER SINGLE-SIDED CLAMP MECHANISM IN STEERING COLUMN

(71) Applicant: Melvin L. Tinnin, Clio, MI (US)

(72) Inventor: Melvin L. Tinnin, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 13/828,295

(22) Filed: Mar. 14, 2013

(65) Prior Publication Data

US 2014/0260759 A1 Sep. 18, 2014

(51) Int. Cl.
 *B62D 1/185* (2006.01)

(52) U.S. Cl.
 CPC ........................ *B62D 1/185* (2013.01)
 USPC ............................... 74/493; 280/775

(58) Field of Classification Search
 USPC ............................ 280/775; 74/493
 See application file for complete search history.

(56) References Cited

U.S. PATENT DOCUMENTS

| 5,074,586 | A | 12/1991 | Baskett |
| 5,161,425 | A | 11/1992 | Baskett et al. |
| 5,607,184 | A | 3/1997 | Barton |
| 5,730,465 | A | 3/1998 | Barton et al. |
| 5,769,454 | A | 6/1998 | Duval et al. |
| 7,685,903 | B2 * | 3/2010 | Streng et al. ..................... 74/493 |
| 7,819,426 | B2 * | 10/2010 | Streng et al. .................. 280/775 |
| 7,874,228 | B2 * | 1/2011 | Clark et al. ...................... 74/493 |
| 8,042,426 | B2 * | 10/2011 | Jo ...................................... 74/493 |
| 2006/0170204 | A1 * | 8/2006 | Higashino et al. ............ 280/775 |
| 2009/0064814 | A1 * | 3/2009 | Tanaka ............................. 74/493 |

* cited by examiner

*Primary Examiner* — Drew Brown

(74) *Attorney, Agent, or Firm* — Cantor Colburn LLP

(57) ABSTRACT

An adjustable steering column for a vehicle is provided. The adjustable steering column includes a mounting bracket configured to be secured to an adjacent vehicle component, the mounting bracket having a first leg extending therefrom, a lower jacket having an axial opening extending along its length along a first axis, and an upper jacket extending along the first axis telescopically received in the axial opening of the lower jacket. A rake bolt extends along a second axis through the first leg from a first side to a second side of the first leg. The second axis intersects the upper jacket and at least a portion of the rake bolt is received within the lower jacket. A clamping mechanism is positioned on the rake bolt and is configured to apply a clamping force to the upper jacket to secure the upper jacket against telescope movement.

13 Claims, 4 Drawing Sheets

ON-CENTER SINGLE-SIDED CLAMP MECHANISM IN STEERING COLUMN

BACKGROUND OF THE INVENTION

The following description relates to an adjustable steering column, and in particular an adjustable steering column having an on center, single sided, rake and telescope clamp mechanism.

Adjustable steering columns may be adjustable in a rake direction and a telescope direction. A traditional adjustable steering column includes a clamp mechanism that is actuatable between a clamped position where adjustment of the steering column is prevented and an unclamped position where adjustment of the steering column is allowed. Typically, the clamp mechanism is actuated between clamped and unclamped positions by rotation of a lever.

In traditional adjustable steering columns, a bolt and lever extend along an axis that is spaced from the steering shaft so that the bolt may extend completely across a rake bracket without interfering with shaft components. However, such a configuration may use additional space in and around the steering column assembly and possibly interfere with passenger movement in a vehicle cabin. In addition, the clamp mechanism may be positioned along the bolt, taking up additional space. Packaging requirements restrict the location of a rake and telescope locking devices.

Accordingly, it is desirable to provide an adjustable steering column having a mechanism, such as a clamp mechanism, on or near a center of the steering column with an actuating lever similarly positioned.

SUMMARY OF THE INVENTION

According to an exemplary embodiment of the present invention, there is provided and adjustable steering column for a vehicle, the adjustable steering column having a mounting bracket configured to be secured to an adjacent vehicle component, the mounting bracket having a first leg extending therefrom. A lower jacket extends within the mounting bracket and has an axial opening extending along its length along a first axis. An upper jacket extends along the first axis and is telescopically received in the axial opening of the lower jacket. A rake bolt extends along a second axis through the first leg from a first side to a second side of the first leg, the second axis intersecting the upper jacket, at least a portion of the rake bolt received within the lower jacket, and a clamping mechanism is positioned on the rake bolt and is configured to apply a clamping force to the upper jacket to secure the upper jacket against telescope movement relative to the lower jacket.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, and adjustable steering column having an on center single sided clamp mechanism is provided.

Figure 1:
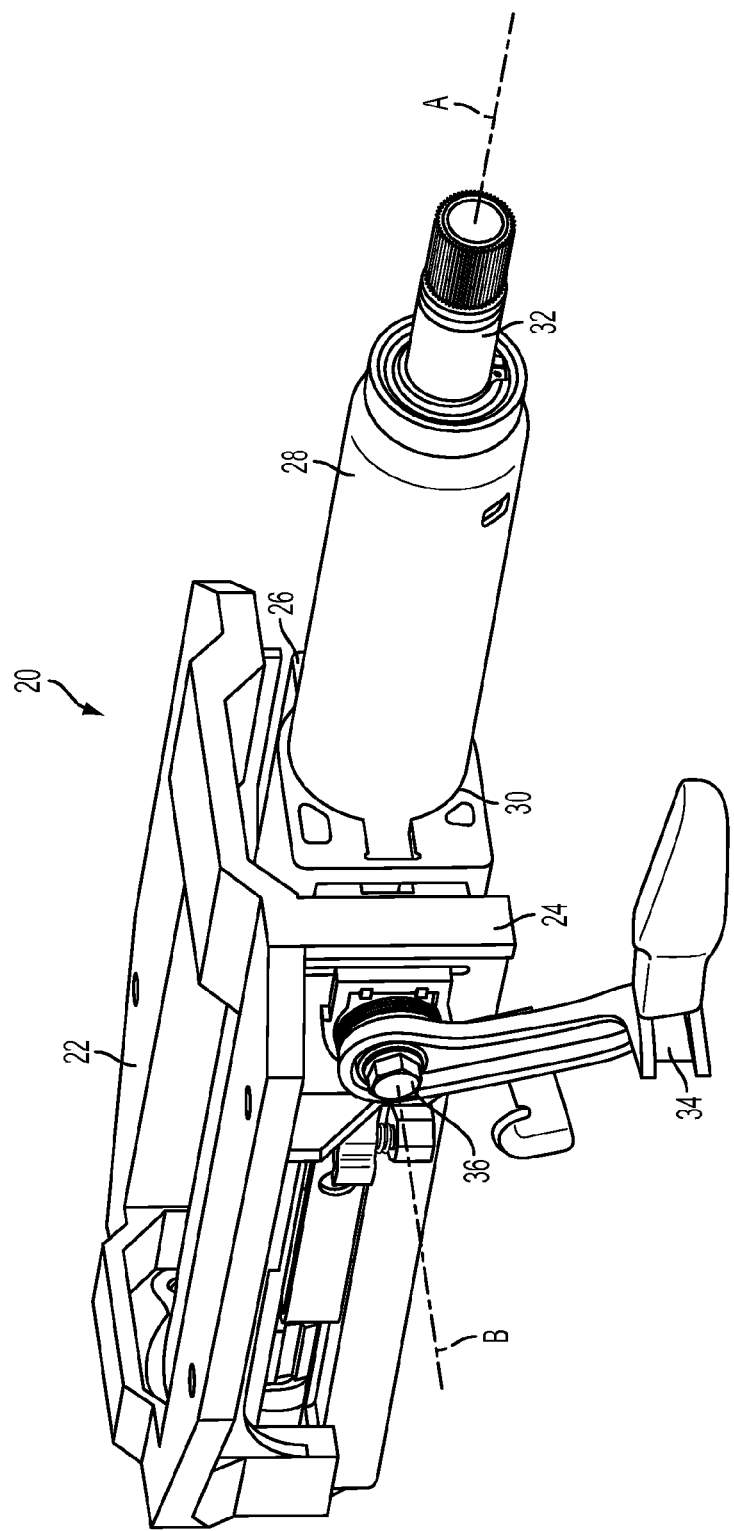
FIG. 1 is a perspective view of an adjustable steering column according to an exemplary embodiment of the present invention.

FIG. 1 is a perspective view of an adjustable steering column 20 according to an exemplary embodiment of the present invention. The adjustable steering column 20 includes a mounting bracket 22 having a first leg 24 extending therefrom. The mounting bracket is configured to be secured to an adjacent vehicle component to secure the adjustable steering column 20 in the vehicle.

The adjustable steering column further 20 also includes a lower jacket 26 and an upper jacket 28. The lower jacket 26 includes an axial opening 30 extending along its length on a first axis 'A'. The lower jacket 26 may be formed as an extrusion, but is not limited thereto. The upper jacket 28 extends along the first axis 'A' and is telescopically received in the axial opening 30 of the lower jacket 26. A steering bearing 32 extends from the upper jacket 28 and is configured to have a steering wheel (not shown) attached thereto. The upper jacket 28 is selectively movable in the lower jacket 26 to adjust the steering column 20 in a telescope direction. In particular, with the adjustable steering column 20 in an unlocked, or unclamped, condition, the upper jacket 28 may be adjusted telescopically within the lower jacket 26. Conversely, with the adjustable steering column 20 in a locked, or clamped, condition, adjustment or movement of the upper jacket 28 within the lower jacket 26 is restricted.

Still referring to FIG. 1, the adjustable steering column 20 further includes an operating lever 34. The operating lever 34 is positioned on a rake bolt 36 and is configured to rotate about a second axis 'B'. Rotation of the operating lever 34 actuates the adjustable steering column 20 between the locked condition and unlocked condition as further described below.

Figure 2:
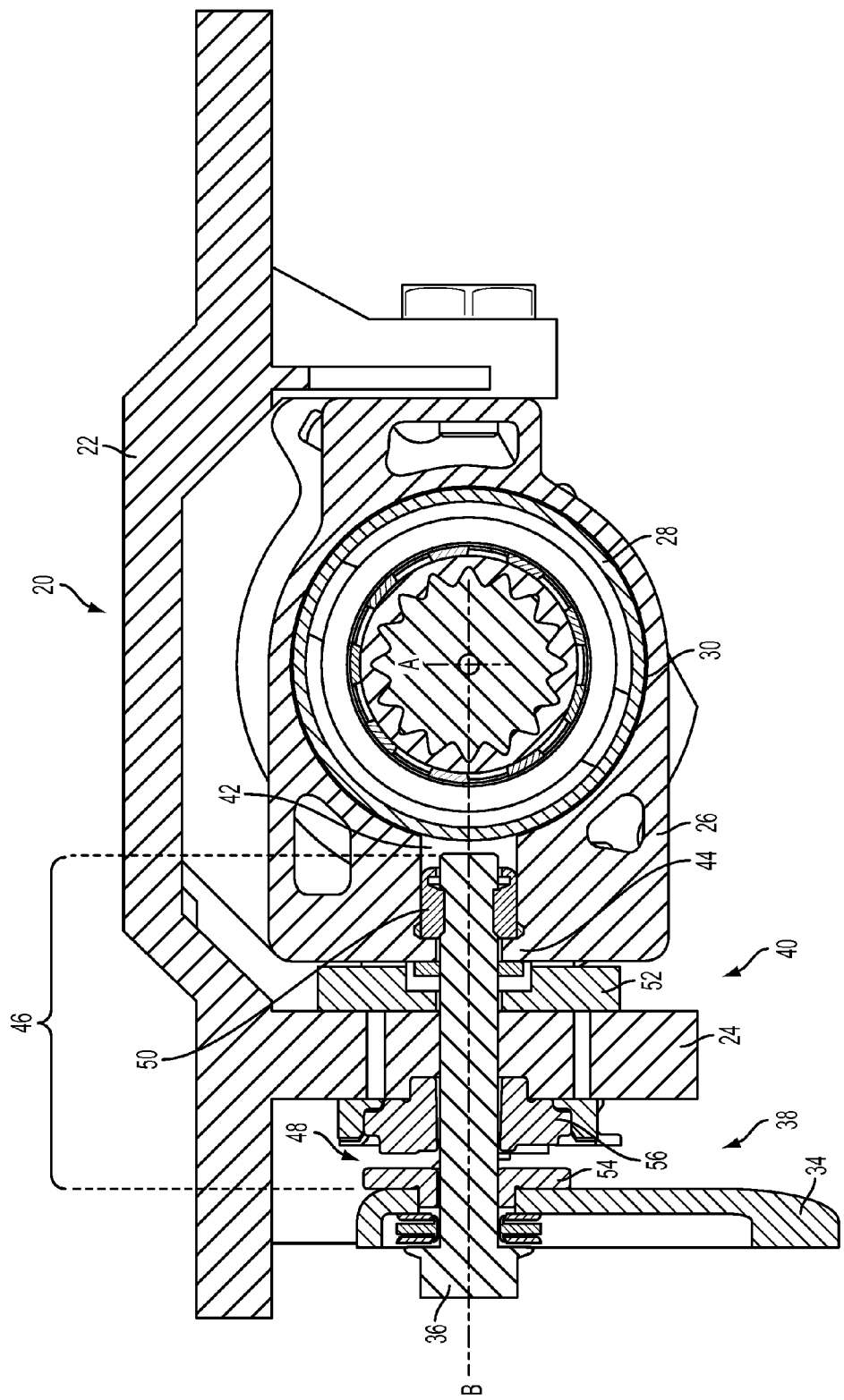
FIG. 2 is a cross section view of the adjustable steering column according to an exemplary embodiment of the present invention.

FIG. 2 illustrates a cross section of the adjustable steering column 20 in the direction of the first axis 'A'. Referring to FIG. 2, the rake bolt 36 extends along the second axis 'B' through the first leg 24 of the mounting bracket 22 from a first side 38 to a second side 40 of the first leg 24. A portion of the rake bolt 36 is received in the lower jacket 26 at the second side 40 of the first leg 24. The operating lever 34 is positioned on the rake bolt 36 at the first side 38 of the first leg 24. In an exemplary embodiment, the operating lever 34 rotates about the rake bolt 36 and the rake bolt 36 is restrained from rotating during operation.

The second axis 'B' intersects the upper jacket 28. That is, the rake bolt 36 terminates at a position outside of the upper jacket 28. However, the rake bolt 36 extends along the second axis 'B'. The second axis 'B', if extended beyond the extent of the rake bolt 36, intersects the upper jacket 28. In an exemplary embodiment, the second axis 'B' intersects the first axis 'A'. Thus, the steering column 20 may be made of a more compacts size since the rake bolt 36, and hence, the operating lever 34, are not positioned along an axis spaced from the upper jacket 28.

Figure 4:
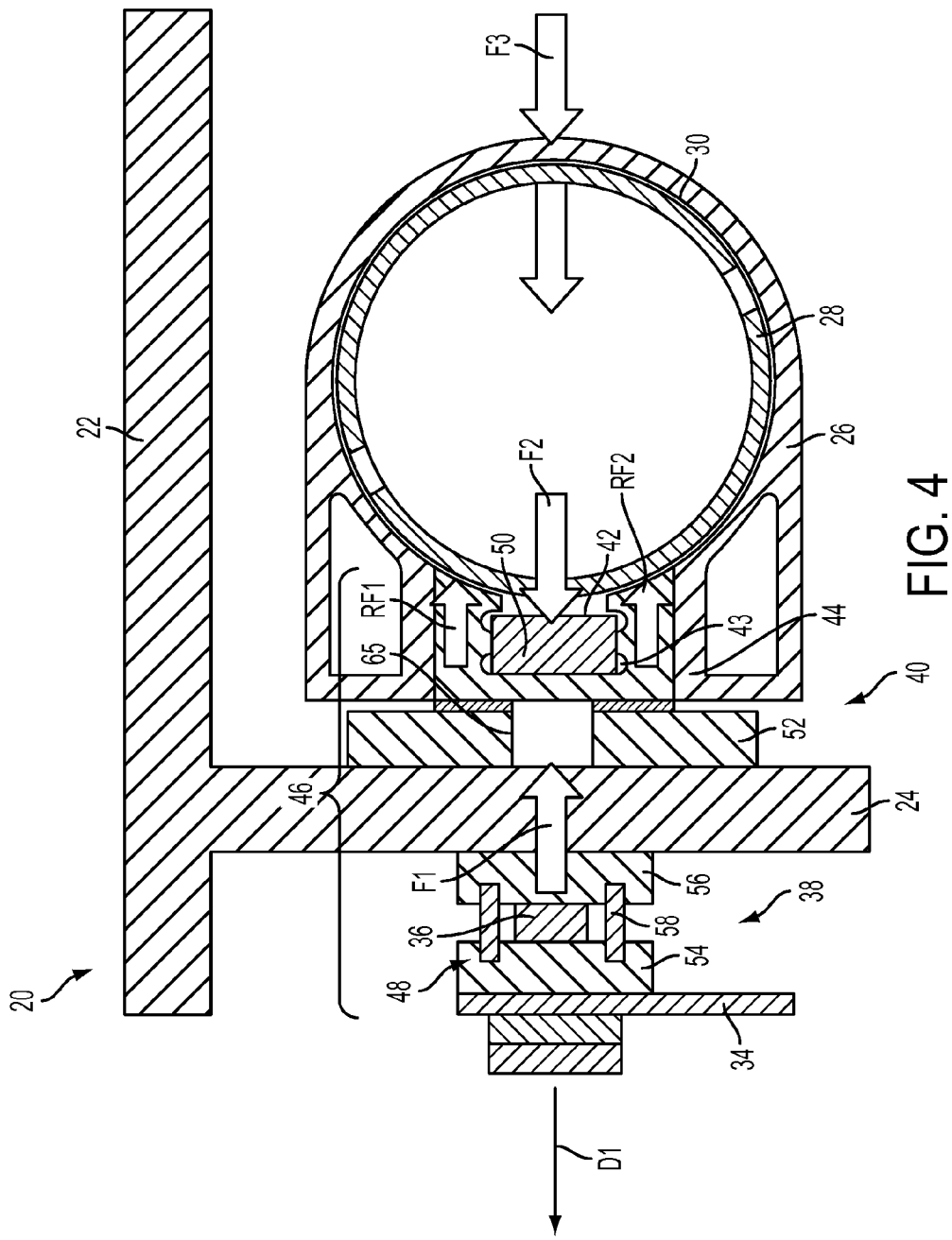
FIG. 4 is a diagram of the adjustable steering column showing various forces applied in the steering column.

With further reference to FIG. 2, the lower jacket 26 also includes a longitudinal slot 42 extending along, and in communication with, the axial opening 30. In addition, the lower jacket 26 includes a first wall 44 proximate to the longitudinal slot 42. The rake bolt 36 extends through the first wall 44 into the longitudinal slot 42. The longitudinal slot 42 may include a pair of longitudinal grooves 43 formed on opposing walls (FIG. 4).

Still referring to FIG. 2, the adjustable steering column 20 further includes a clamping mechanism 46 positioned on the rake bolt 36. The clamping mechanism 46 is configured to apply a clamping force to the upper jacket 28 to secure the upper jacket against movement relative to the lower jacket 26. In an exemplary embodiment, the clamping mechanism 46 includes a cam 48, a radial extension 50 and a clamp bracket 52.

In an exemplary embodiment, the cam 48 is any cam of the type where rotation of the operating lever 34 causes rotational and linear motion of the cam 48. For example, the cam 48 may be a pin type cam having a first cam part 54 and a second cam part 56. A plurality of pins 58 (FIG. 4) are positioned between the first cam part 54 and the second cam part 56. In one example, the operating lever 34 may be operably connected to the first cam part 54, such that rotation of the operating lever causes the first cam part 54 to rotate on the rake bolt 36. Rotation of the first cam part 54 in a first direction causes the pins 58 to move from an angled position where an axial distance between the first cam part 54 and second cam part 56 is minimized and an extended position where pins 58 push the first cam part 54 and second cam part 56 axially apart from one another along the rake bolt 36 and apply an axial force to adjacent components. It is understood that the cam described above is for the purposes of example only, and the present invention is not limited to such a pin type cam. Other suitable cam devices may be used, such as a cam including opposing ramps on the first and second cam parts.

The radial extension 50 is positioned on the rake bolt 36 at the second side 40 of the first leg 24. In an exemplary embodiment the radial extension 50 is positioned in the lower jacket 28, and in particular, in the longitudinal slot 42. The radial extension 50 may be, for example, a nut that is threadably fastened on the rake bolt 36. However, other configurations are envisioned. For example, the radial extension 50 may be an integrally formed head of the rake bolt 36 or other machined projection.

Figure 3:
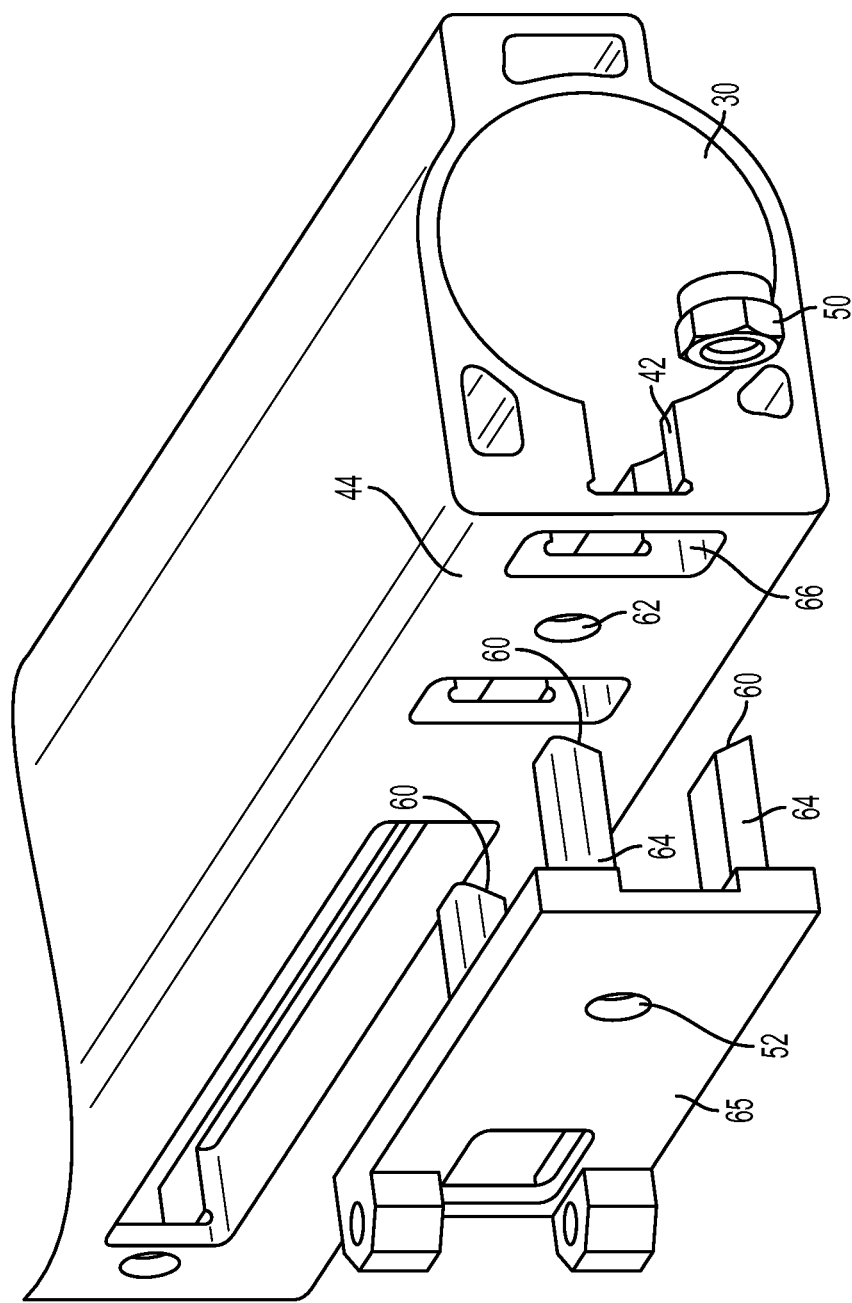
FIG. 3 is an exploded perspective view of several components of the adjustable steering column according to an exemplary embodiment of the present invention.

FIG. 3 is an exploded view of the clamp bracket 52 and the lower jacket 26. With reference to FIGS. 2 and 3, the clamp bracket 52 is positioned at the second side 40 of the first leg 24. The clamp bracket 52 includes at least one clamp surface 60 configured selectively engage the upper jacket.

Referring still to FIGS. 2 and 3, the first wall 44 of the lower jacket 26 may further include a first opening 62 through which the rake bolt 32 extends. In an exemplary embodiment, the radial extension 50 is positioned on the rake bolt 32 within the longitudinal slot 42 adjacent to the first opening 62.

Referring to FIG. 3, the clamp bracket 52 may further include at least one clamp leg 64, where each clamp leg 64 includes one of the clamp surfaces 60 at an end thereof. In an exemplary embodiment, the clamp bracket 52 may include four clamp legs 64, each clamp leg 64 having a clamp surface 60 configured to selectively engage the upper jacket 28. It is understood that different numbers of clamp legs 64 are envisioned as well. The clamp bracket 52 also includes a bracket opening 65 through which the rake bolt 36 extends.

The first wall 44 of the lower jacket 26 may further include at least one second opening 66. One or more clamp legs 64 may extend through each of the second openings 66. With reference to FIG. 3, in an exemplary embodiment, two clamp legs 64 may extend through each of the second openings 44. However, it is understood that this configuration is non-limiting, and additional or fewer clamp legs may extend through each second opening 64.

FIG. 4 is a cross sectional diagram of the adjustable steering column illustrating the various forces applied during operation. With the adjustable steering column 20 in an unlocked condition, a user may rotate the operating lever 34 in the first direction.

In operation, a user rotates the operating lever 34 in a first direction to place the adjustable steering column 20 in the locked condition. Rotation of the operating lever 34 causes the cam 48 to apply a first axial force F1 to the first leg 24 due to the first and second cam parts 54, 56 moving axially away from each other. The relative movement of the first and cam parts 54, 56 axially away from each other also causes the rake bolt 36 to move along the second axis 'B' in a first linear direction D1, via a connection between the first cam part 54, operating lever 34 and rake bolt 36. The first linear direction D1 extends away from the first axis 'A'.

The radial extension 50 engages the longitudinal slot 42, and in particular, a portion of the first wall 44. Movement of the rake bolt 36 in the first linear direction D1 causes the radial extension 50 to apply a second axial force F2 on the lower jacket 26 to move the lower jacket 26 in the first linear direction D1. Movement of the lower jacket 26 in the first linear direction D1 causes the lower jacket 26 to apply a third axial force F3 to the upper jacket 28 and move the upper jacket 28 into contact with the at least one clamp surface 60 of the clamp bracket 52 such that a reaction force from the clamp bracket 52 and the third axial force form the clamping force to clamp and secure the upper jacket 28 against movement in a telescope direction relative to the lower jacket 26. In an exemplary embodiment, the reaction force includes multiple reaction forces RF1, RF2, applied from clamp surfaces 60 formed on the clamp legs 64 (FIG. 3). That is, for every clamp leg 64 and clamp surface 60, there is a reaction force RF applied to the upper jacket 26.

To place the adjustable steering column in an unlocked condition, the operating lever 34 is rotated in a second direction opposite to the first direction, which brings the first and second cam parts 54, 56 axially together and releases the various forces described above.

In the exemplary embodiments above, an adjustable steering column having an on-center, single-sided clamping mechanism in a steering column is provided. By locating the rake bolt and clamping mechanism along an axis that intersects the upper jacket 28, space occupied by the mechanism in a passenger cabin of vehicle may be reduced and the mechanism may be more efficiently packaged.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustable steering column for a vehicle, the adjustable steering column comprising:

a mounting bracket configured to be secured to an adjacent vehicle component, the mounting bracket comprising a first leg extending therefrom;

a lower jacket extending within the mounting bracket having an axial opening extending along its length, the axial opening extending along a first axis;

an upper jacket extending along the first axis telescopically received in the axial opening of the lower jacket;

a rake bolt extending along a second axis through the first leg from a first side to a second side of the first leg, the second axis intersecting the upper jacket, at least a portion of the rake bolt received within the lower jacket; and a clamping mechanism positioned on the rake bolt configured to apply a clamping force to the upper jacket to secure the upper jacket against telescope movement relative to the lower jacket, the clamping mechanism further comprising:

a cam positioned on the rake bolt at the first side of the first leg, the cam operable to selectively apply a first axial force to the first leg;

a clamp bracket positioned at the second side of the leg, the clamp bracket having at least one clamp surface configured to selectively engage the upper jacket; and a radial extension positioned on the rake bolt within the lower jacket.

2. The adjustable steering column of claim 1, wherein the lower jacket further comprises a longitudinal slot extending along, and in communication with, the axial opening.

3. The adjustable steering column of claim 2, wherein the radial extension is positioned in the longitudinal slot.

4. The adjustable steering column of claim 3, wherein the radial extension is a nut threadably attached to the rake bolt.

5. The adjustable steering column of claim 3, further comprising an operating lever rotatably positioned on the rake bolt, wherein rotation of the operating lever in a first direction operates the cam to apply the first axial force to the first leg and moves the rake bolt in a first direction away from the first axis.

6. The adjustable steering column of claim 5, wherein the radial extension engages the longitudinal slot, and movement of the rake bolt in the first direction causes the radial extension to apply a second axial force on the lower jacket to move the lower jacket in the first direction, thereby causing the lower jacket to apply a third axial force to the upper jacket and move the upper jacket into contact with the at least one clamp surface of the clamp bracket such that a reaction force from the clamp bracket and the third axial force clamp and secure the upper jacket against movement in a telescope direction relative to the lower jacket.

7. The adjustable steering column of claim 3, wherein the lower jacket further comprises a first wall, the first wall having a first opening through which the rake bolt extends, wherein the radial extension is positioned on the rake bolt adjacent to the first wall within the lower jacket.

8. The adjustable steering column of claim 6, wherein the clamp bracket further comprises at least one clamp leg and a clamp surface of the at least one clamp surface is formed on an end of each clamp leg.

9. The adjustable steering column of claim 8, wherein the first wall further comprises at least one second opening, one or more clamp legs of the at least one clamp legs extending through each second opening of the at least one second opening.

10. The adjustable steering column of claim 3, wherein the operating lever is connected to the cam and the cam is a pin cam comprising a first cam part, a second cam part, and at least two pins positioned between the first cam part and the second part, the first cam part rotatable relative to the second cam part in response to rotation of the operating lever.

11. The adjustable steering column of claim 1, wherein the mounting bracket further comprises a second leg, and the lower jacket and upper jacket are positioned between the first leg and second leg.

12. The adjustable steering column of claim 1, wherein the lower jacket is an extrusion.

13. The adjustable steering column of claim 1, wherein the second axis intersects the first axis.

\* \* \* \* \*